United States Patent [19]

Erlandsson

[11] Patent Number: 4,695,216
[45] Date of Patent: Sep. 22, 1987

[54] VEHICLE RESTRAINT

[75] Inventor: Kjell I. Erlandsson, Milwaukee, Wis.

[73] Assignee: Kelley Company, Inc., Milwaukee, Wis.

[21] Appl. No.: 863,054

[22] Filed: May 14, 1986

[51] Int. Cl.[4] .............................................. B65G 67/02
[52] U.S. Cl. .................................... 414/401; 414/396
[58] Field of Search .................. 414/401, 396, 584; 14/71.3; 16/82, 83, 85; 292/169.11

[56] References Cited

U.S. PATENT DOCUMENTS

| 3,946,460 | 3/1976 | Johnson | 16/82 |
|---|---|---|---|
| 4,127,856 | 11/1978 | Bickel | 414/401 X |
| 4,134,608 | 1/1979 | Pool | 16/82 X |
| 4,208,161 | 6/1980 | Hipp et al. | 414/401 |
| 4,216,986 | 8/1980 | McNinch et al. | 16/82 X |
| 4,264,259 | 4/1981 | Hipp | 414/401 |
| 4,267,748 | 5/1981 | Grunewald et al. | 74/529 |
| 4,282,621 | 8/1981 | Anthony | 14/71.1 |
| 4,373,847 | 2/1983 | Hipp et al. | 414/401 |
| 4,443,150 | 4/1984 | Hahn et al. | 414/402 |
| 4,472,099 | 9/1984 | Hahn | 414/401 |
| 4,488,325 | 12/1984 | Bennett et al. | 14/71.3 |
| 4,560,315 | 12/1985 | Hahn | 414/401 |
| 4,589,813 | 5/1986 | Hagen et al. | 414/401 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |

Primary Examiner—Peter A. Aschenbrenner
Attorney, Agent, or Firm—Andrus, Sceales, Starke & Sawall

[57] ABSTRACT

A vehicle restraint for preventing a vehicle such as a truck from accidentally pulling away from a loading dock during a loading operation. The vehicle restraint comprises a mounting plate mounted on the front vertical face of the loading dock and a slide is mounted for movement on the mounting plate and is biased to an upper position. The slide is provided with an angular front surface that is inclined downwardly and outwardly. When a truck backs toward the loading dock, an abutment, such as an ICC bar at the rear end of the truck, will engage the inclined surface, wedging the slide downwardly against the force of the biasing means and the ICC bar will then be received within a recess or notch located in the upper edge of the slide. To release engagement of the ICC bar from the notch, a release bar is moved upwardly into engagement with the ICC bar, thereby driving the slide downwardly against the force of the biasing means to release the ICC bar from the notch and enabling the truck to pull away from the dock.

24 Claims, 8 Drawing Figures

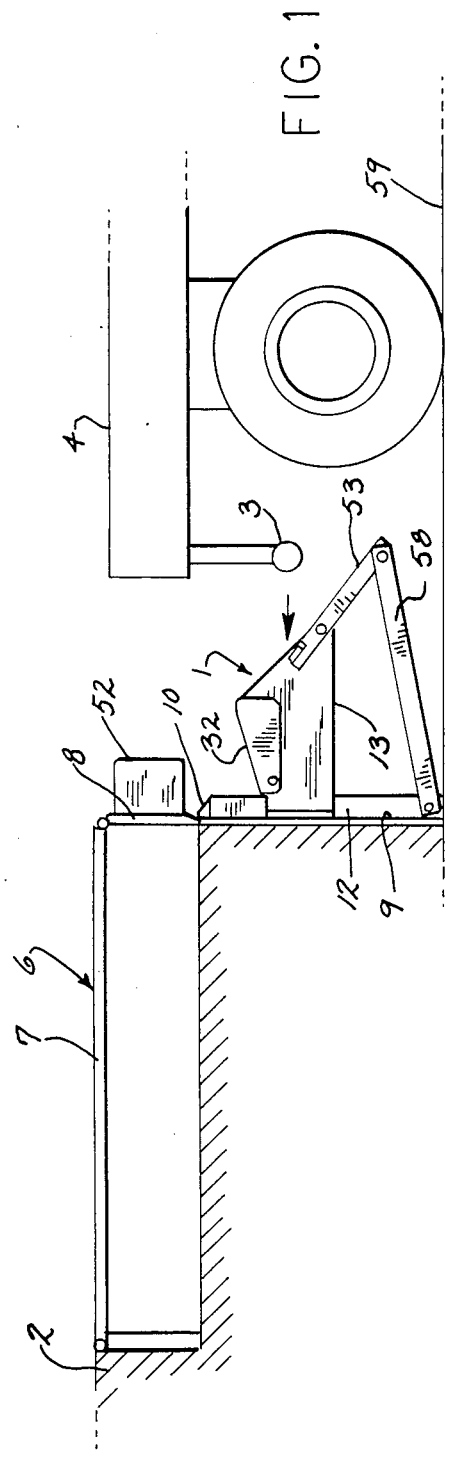
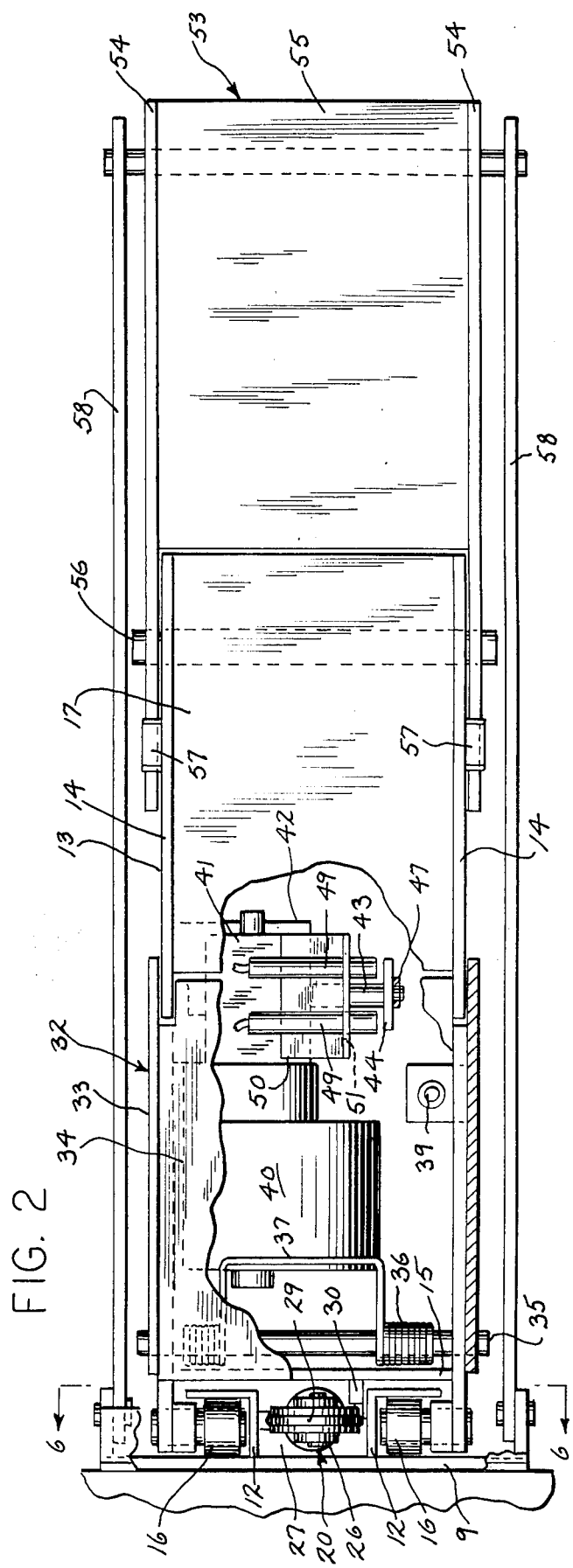
FIG. 1
FIG. 2

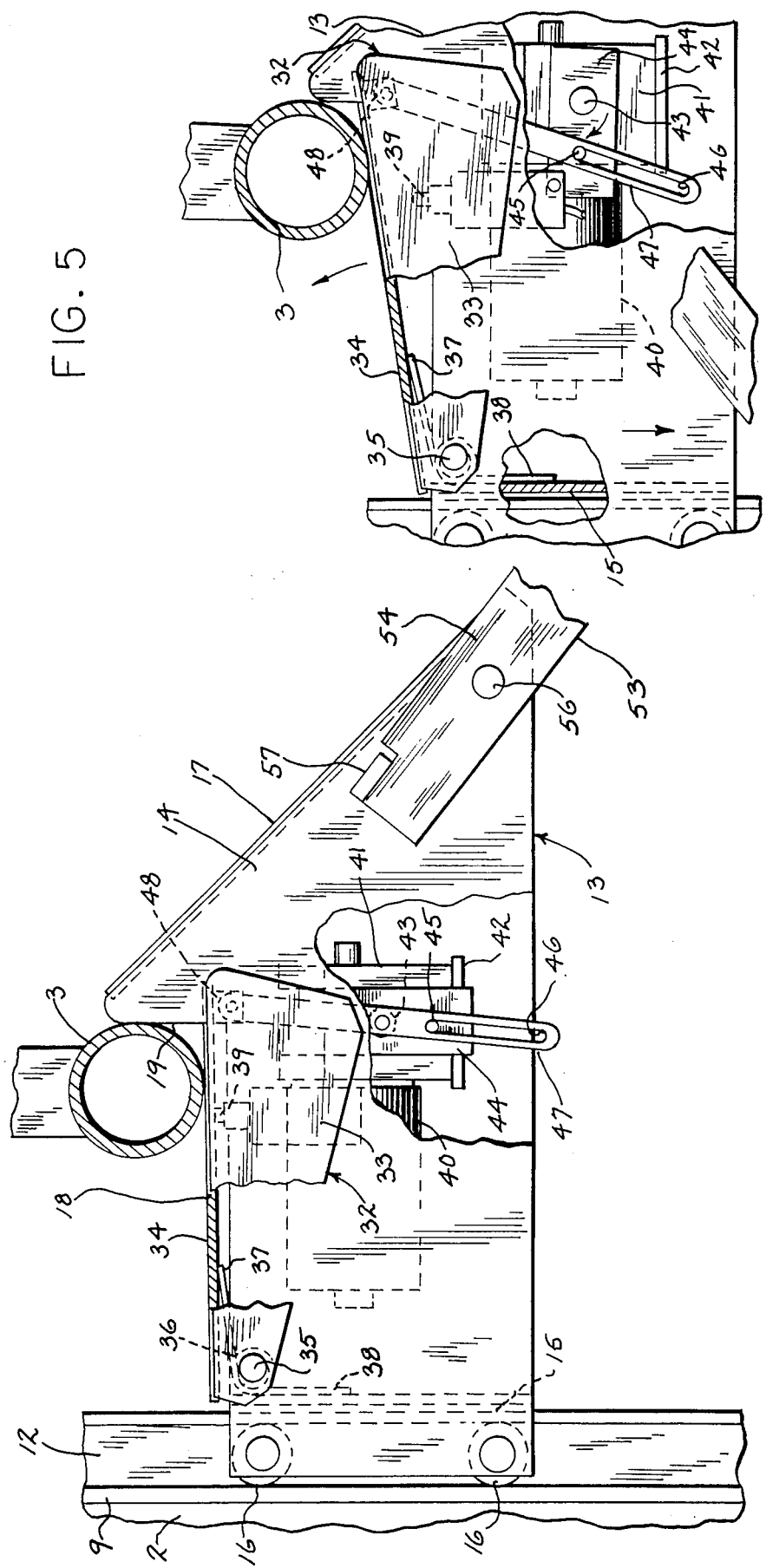

VEHICLE RESTRAINT

BACKGROUND OF THE INVENTION

Vehicle retraints have been employed to lock a truck or other vehicle to a loading dock to prevent the truck from accidentally pulling away from the dock during a loading operation. A conventional loading dock includes a doorway which is normally enclosed by an overhead door. When the truck backs toward the loading dock for the loading operation, the rear end of the truck body completely encloses the doorway so there is no direct communication between the truck driver and an operator on the loading dock. As the loading operation is normally carried out by a fork lift truck moving between the dock and the truck bed, it is critical that the truck not move away from the loading dock during the loading operation. Thus, truck restraints have been employed to prevent the accidental movement of the truck from the dock during a loading operation.

The conventional truck restraint is mounted on the front face of the dock and is operable to engage the ICC bar at the rear end of the truck. The ICC bar is a horizontal bar or beam located beneath the truck bed to prevent underriding of an automobile in the event of a rear end collision.

A common form of truck restraint as disclosed in U.S. Pat. No. 4,488,325 include a power operated hook, in which the hook is moved verticlaly from a lower storage position to an upper operating position where it engages the ICC bar. Other truck restraints, such as disclosed in U.S. Pat. Nos. 4,282,621 and 4,264,259 employ a pivoting hook in which the hook is pivoted either manually or through a power operated mechanism from a lower inopertive position to an upper operative or lock position.

It is also known in the prior art to utilize a sliding carriage plate in a vehicle restraint to permit the restraint to follow upward and downward movement of the truck bed when the vehicle restraint is in the locked position. As disclosed in U.S. Pat. Nos. 4,282,621 and 4,264,259, a generally triangular carriage plate is mounted for sliding movement on the front face of the dock and the forward edge of the plate slopes downwardly and outwardly away from the dock. The carriage plate, as disclosed in the aforementioned patents, is biased to an upper position, and as the truck backs toward the loading dock, the ICC bar will engage the inclined surface wedging the plate downwardly against the force of the biasing means. With the truck engaged with the bumpers on the dock face, a hook is then moved upwardly to engage the ICC bar and lock the truck to the dock.

SUMMARY OF THE INVENTION

The invention is directed to an improved vehicle restraint for preventing accidental movement of a truck or other vehicle away from a loading dock. In accordance with the invention, the restraint includes a mounting plate which is mounted on the front vertical face of the dock and a slide is mounted for sliding vertical movement on the mounting plate. The forward end of the slide is inclined, sloping downwardly and outwardly away from the dock, and the slide is biased to an upper position.

As the truck backs toward the loading dock, the ICC bar will engage the inclined surface of the slide, wedging the slide down against the biasing means, and the ICC bar will then fall into a recess or notch formed in the upper end of the slide. Engagement of the ICC bar with the notch will prevent the truck from pulling away from the loading dock during the loading operation.

To release the ICC bar from the notch, a release bar, which is mounted for movement relative to the slide, is moved upwardly against the ICC bar. The upward force exerted against the ICC bar will result in a downward force being applied to the slide which will move the slide downwardly against the force of the biasing mechanism to release the ICC bar from engagement with the notch in the slide, enabling the truck to pull away from the dock.

The release bar is also mounted such that, in conjunction with a limit switch, it can be used to sense the presence of the ICC bar in the notch.

As the slide is in an intermediate position when the ICC bar is engaged with the notch, the slide is capable of moving both upwardly and downwardly to accommodate upward and downward float of the truck bed during a loading operation.

In one form of the invention, a power operated mechanism carried by the slide is employed to operate the release bar to move the slide downwardly against the force of the biasing mechanism and release engagement of the restraint. In a second form of the invention, a manually operated mechanism is employed to actuate the release bar. In either case the release mechanism need only be of sufficient force to overcome the force of the biasing mechanism of the slide so that operation of the release mechanism acting against the ICC bar will move the slide downwardly against the force of the biasing mechanism.

As a further feature of the invention, an extension leg can be pivotally connected to the slide and forms an extension to the inclined surface of the slide. The leg is prevented from pivoting downwardly relative to the slide but can freely pivot upwardly. If a truck having a low ICC bar backs toward the dock, the ICC bar will initially engage the leg, wedging the carriage downwardly, and the ICC bar will then ride along the incline surface of the slide. As the ICC bar rides against the incline carriage, the leg will be pivoted upwardly because of a fixed link connection to the frame, thereby enabling the slide to continue to move downwardly until the ICC bar engages the notch in the upper edge of the slide. The use of the extension leg increases the operating range of the vehicle restraint for a slide or carriage of given vertical dimension.

The restraint of the invention provides a positive lock of the truck or other vehicle to the loading dock and can be readily released through a release mechanism activated from the loading dock.

As all the working components, such as a biasing mechanism for the slide and the power operating mechanism for the release bar, are housed within the slide, a more attractive and compact unit is provided, as well as preventing possible damage to the operating components.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the vehicle restraint shown in the storage or inoperative position;

FIG. 2 is a top plan view of the vehicle restraint with parts broken away in section;

FIG. 4 is a view similar to FIG. 3 and showing the vehicle restraint engaged with the ICC bar on a truck;

FIG. 5 is a fragmentary side elevation with parts broken way showing the mechanism for releasing the vehicle restraint from the ICC bar;

DESCRIPTION OF THE ILLUSTRATED EMBODIMENT

Figure 3:
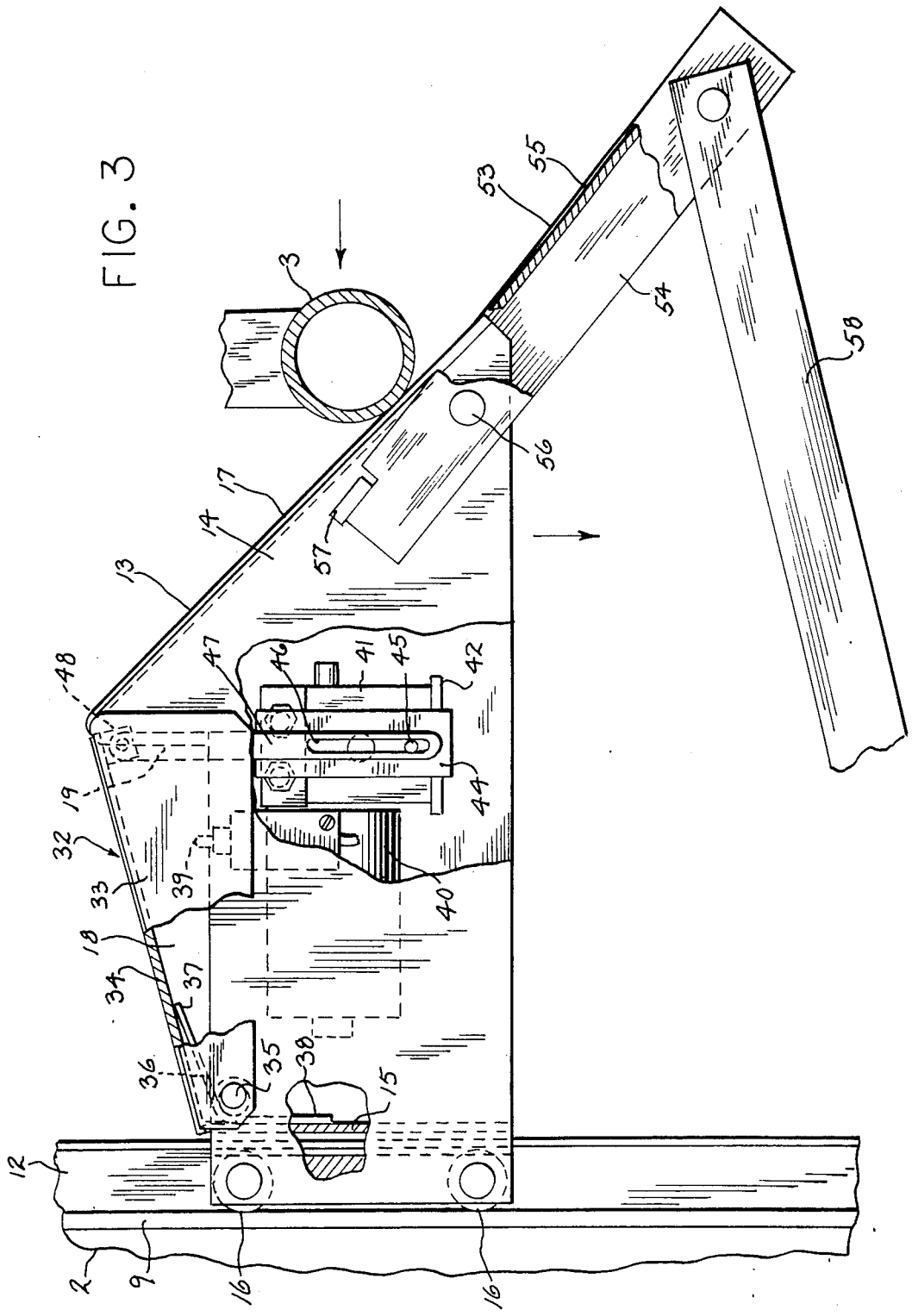
FIG. 3 is an enlarged side elevation of the vehicle restraint.

The drawings illustrate a vehicle restraint 1 mounted on a loading dock 2 and adapted to engage an ICC bar 3 located at the rear end of truck 4 to prevent the truck from accidentally pulling away from the loading dock while a loading operation is in progress.

The ICC bar 3 is a horizontal bar or beam located at the rear of the truck beneath the truck bed and acts to prevent an automobile from underriding the truck in the event of a rear end collision. Delivery and over the road trucks are required to have an ICC bar, although the cross sectional configuration may vary and the height of the ICC bar above the ground may also vary within prescribed limits.

In most installations, loading dock 2 will also include a pit or depression 5 and a dockboard 6 is mounted within the pit. The dockboard may take the form of that disclosed in U.S. Pat. No. 4,488,325, and in general, includes a ramp 7 which is hinged at its rear edge to the frame of the dockboard and is movable between a generally horizontal cross traffic position and an upwardly inclined postion. Pivoted to the forward end of the ramp is a lip 8 which can be moved between a downwardly hanging pendant position and an outwardly extended position where the lip forms an extension to the ramp and can engage the bed of the truck 4. Dockboard 6 in itself forms no part of the present invention and the vehicle restraint can be mounted on loading docks that may or may not include a dockboard.

Vehicle restraint 1 includes a mounting plate 9 which is secured to the front face of dock 2 through a series of conventional anchor bolts, not shown. A weldment 10 is secured to the upper end of mounting plate 9 and includes an angular plate 11 which serves to guide the lower end of the pendant lip 8 of the dockboard outwardly away from the mounting structure.

A pair of angle shape guide tracks 12 are mounted in spaced relation on mounting plate 9 and a slide or carriage 13 is mounted for vertical sliding movement in tracks 12. Carriage 13 includes a pair of generally vertical spaced side plates 14 which are connected at their inner ends by a cross plate 15. Upper and lower roller 16 are journalled on the inner ends of each side plate 14 and the rollers 16 are adapted to ride in tracks 12 to facilitate vertical movement of carriage 13.

An inclined plate 17 is secured to the upper edges of the outer portions of side plates 14, and plate 17 extends downwardly and outwardly from the dock at an angle of about 40° to the horizontal. The upper edge of each side plate 14 is cut out to provide a notch 18 and the outer end of each notch 18 is bordered by a generally vertical shoulder 19.

Figure 6:
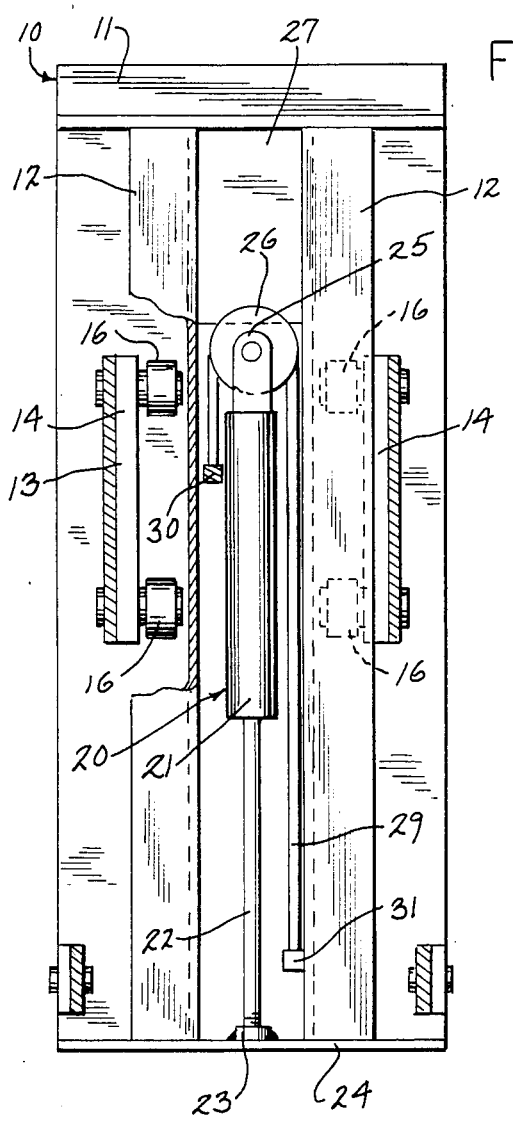
FIG. 6 is a section taken along line 6—6 of FIG. 2 and showing the biasing mechanism for the slide.

Slide 13 is biased to an upper position with respect to mounting plate 9 by a gas spring assembly 20. As shown in FIG. 6, gas spring assembly 20 includes a cylinder 21 that contains a compressed gas, such as nitrogen, and a piston rod 22 extends outwardly from the lower end of cylinder 21 and is threaded in a nut 23 that is mounted on base plate 24 which projects outwardly from the lower end of mounting plate 9. The upper end of gas cylinder 21 carries a clevis 25 and a pulley 26 is journalled in clevis 25. As best shown in FIG. 2, pulley 26 is adapted to move vertically in a track or channel 27 that is bordered by the legs of angles 12.

A cable 29 is trained over pulley 26 and one end of cable 29 is secured to a lug 30 on slide 13. which projects inwardly from cross plate 15, while the opposite end of cable 29 is dead-ended at 31 on one the angles 12.

With this construction, the force of the gas spring assembly 20 will tend to extend the piston rod 22 and urge slide 13 to an upper position relative to mounting plate 9. The use of the pulley 26 and cable 29 provides a 2:1 stroke of travel for slide 13 with respect to the stroke of piston rod 22.

As a truck 4 backs toward loading dock 2, the ICC bar 3 will engage the inclined surface 17 on slide 13, thereby wedging the slide downwardly against the force of the gas spring assembly 20. Continued movement of the truck toward the loading dock will wedge the slide 13 down to a position where the ICC bar will fall into the notch 18 in the upper surface of the slide to thereby lock the ICC bar and truck against outward movement in a direction away from the loading dock. Slide 13 thus constitutes a restraining member. If the truck attempts to pull away from the dock, while locked to the vehicle restraint, the ICC bar 3 will engage the upstanding shoulder 19 to prevent outward movement of the ICC bar and truck. With this construction, the entire slide 13 and mounting assembly is used to restrain outward movement of the vehicle.

The stroke of the gas spring assembly 20 is correlated with the travel of slide 13 so that the force of the gas spring assembly or biasing mechanism is not fully expended when the slide or restraining member 13 is engaged with the ICC bar. Thus, the gas spring assembly will enable the vehicle restraint to follow both upward and downward float of the ICC bar and truck bed during a loading operation.

The vehicle restraint includes a release member 32 composed of a pair of spaced generally vertical side plates 33 which are connected by a top plate 34. Release member 32 is pivotally connected to the upper portion of slide 13 by a horizontal shaft 35, and a torsion spring 36 is employed to bias the member 32 to an upper position, as shown in FIGS. 1 and 3, where the release member extends upwardly and outwardly from dock 2. As shown in FIGS. 2 and 3, torsion spring 36 includes a central section 37 which bears on the underside of top plate 34, while the ends 38 of the torsion spring bear against the cross plate 15. Thus, the force of torsion spring 36 will urge the release member 32 to the upper position.

As the truck 4 backs toward dock 2 and the ICC bar 3 wedges carriage 13 downwardly, the ICC bar will fall into the notch 18 thereby pivoting release member 32 downwardly to a generally horizontal position as shown in FIG. 4. When release member 32 is moved to the horizontal position, it actuates a limit switch 39 which is mounted within slide 13 on one of the side plates 14. Actuation of limit switch 39 will operate a signal on loading dock 2 indicating to the operator that the vehicle restraint is hitched with the ICC bar. The signal may commonly take the form of a lighted sign which will indicate "hitched" when the release bar is depressed and limit switch 39 is actuated.

After the loading operation has been completed, ICC bar 3 is released from the notch 18, as shown in FIGS. 1-5. The release mechanism includes a motor 40 and a gear box 41 which are mounted on a horizontal shelf 42 projecting inwardly from one of the side plates 14. The output shaft 43 of gear box 41 carries a generally rectangular crank plate 44. Pin 45 projects outwardly from crank plate 44 at a location offset from shaft 43 and pin 45 is mounted for movement in an elongated slot 46 formed in arm 47. The opposite end of arm 47 is pivotally connected to a lug 48 which depends from the outer end of release member 32. With this construction, rotation of shaft 43 will correspondingly rotate crank plate 44 to move arm 47 in a vertical linear path. When the ICC bar 3 is engaged with the notch 18, and release member 32 is depressed, operation of motor 40 will cause an upward force to be exerted through arm 47 against ICC bar 3, and as the ICC bar cannot move upwardly, a reactive force is exerted downwardly against slide 13 causing the slide to move downwardly as shown in FIG. 5, against the force of the gas spring assembly 20, to thereby disengage the ICC bar from notch 18 and enable the truck to pull away from the loading dock.

A pair of proximity sensors 49 are mounted on bracket 50 which is carried on the upper surface of gear box 41. Bracket 50 is provided with a horizontal slot 51 which enables the sensors to be adjusted horizontally, and adjustment of the bracket relative to the gear box enables the proximity sensors to be adjusted toward and away from crank plate 44. After the crank plate is rotated through 180° the sensors 49 will sense the presence of the corners of the crank plate 44 to stop operation of the motor 40.

In operation of the vehicle restraint, the slide 13 is normally in an upper position due to the biasing affect of the gas spring assembly 20, and the release member 32 is in its upper position with pin 45 being positioned in the upper end of slot 46.

As the truck 4 backs toward the loading dock 2, the ICC bar 3 engages the inclined plate 17, wedging slide 13 downwardly against the force of the gas spring assembly 20. When the rear end of the truck engages the bumpers 52, which are mounted in the front face of the dock on either side of pit 5, the ICC bar will be located above the notch 18. If the pin 45, is initially in the upper end of the slot 46, release member 32 will not be depressed by the ICC bar, but instead will be held in the upper position by crank plate 44 and arm 47. This enables the truck to pull away from the dock without being engaged by the vehicle restraint if the truck is misaligned with the dock.

If the truck is properly aligned, the motor 40 is operated causing crank plate 44 to rotate and the slide 13 will float upwardly through the force of the gas spring assembly 20 to depress the release member 32 and engage the ICC bar 3 with the notch 18. The force of gas spring assembly 20 is greater than the force of torsion spring 36. The ICC bar is thus locked to the dock, preventing the truck from pulling away from the dock.

On the other hand, if the pin 45 initially is in the lower end of the slot 46, movement of the ICC bar over the peak of the inclined surface 17 will enable the biasing mechanism to urge the slide plate up, depressing the release member to engage the ICC bar with notch 18.

When the loading operation has been completed and it is desired to permit the truck to pull away from the dock, motor 40 is actuated thereby rotating crank plate 44 and causing an upward force to be exerted through arm 47 against the ICC bar. As the ICC bar 3 cannot move upwardly, a downward reactive force is created against the slide 13 moving the slide downwardly as shown in FIG. 5 until the release member 32 is in its upper position where the outer end of release member 32 is adjacent the upper end of shoulder 19. As the release member 32 is then locked against downward movement, the truck can pull away from the dock, wedging the release bar 32 and slide 13 downwardly as the ICC bar 13 passes over the upper end or peak of the plate 17.

The vehicle restraint on the invention also includes a provision for increasing the operating range for a given vertical dimension of the slide or carriage 13. In this regard an extension leg 53 is connected to the forward end of slide 13. Leg 53 is generally U-shaped in cross section and includes a pair of spaced side walls 54 which are connected together by a top wall 55. Leg 53 is pivotally connected to the side plates 14 of carriage 13 by a shaft 56.

With the position of the pivot shaft 56, leg 53 will tend to pivot by gravity in a clockwise direction as shown in FIG. 3. However, the clockwise pivotal movement is limited by engagement of the upper ends of the side walls 54 with stops 57 that project outwardly from side plates 14 of slide 13. With side walls 54 engaged with stops 57, leg 53 provides an extension to the inclined surface 17 of slide 13.

While the leg 53 is prevented from pivoting downwardly, it can freely pivot upwardly as slide 13 moves downwardly. As shown in FIG. 3, the lower end of leg 53 is connected by a pair of arms or links 58 to angles 11 on mounting plate 9. As slide 13 is wedged downwardly by engagement with ICC bar 3 to a predetermined position, the connection of arms 58 to leg 53 will cause the leg to pivot upwardly, as shown in FIG. 4, to prevent the leg from contacting the driveway 59.

If a truck has a low ICC bar 3 in the range of approximately 15 inches from the ground, the ICC bar, as the truck backs toward the dock, will initially engage leg 53, wedging the leg 53 and slide 13 downwardly against the force of the gas spring assembly 20. As the truck continues to back toward the dock, the ICC bar will ride against the incline plate 17 and ultimately will be engaged with the notch 18, as previously described. However, as the slide 13 is depressed, the outer end of leg 53 will pivot upwardly, because of the connection of arms 58 to the mounting plate 9, to prevent the outer end of leg 53 from contacting the driveway. This construction substantially increases the operating range of the vehicle restraint for a given vertical dimension of slide and yet prevents the extension leg 53 and slide 13 from contacting the driveway 59.

Figure 7:
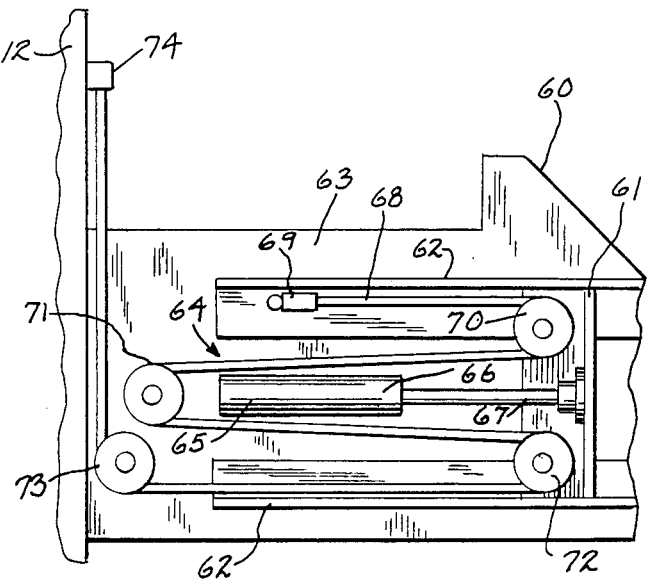
FIG. 7 is a vertical section of further form of the vehicle restraint utilizing a modified biasing mechanism.

FIG. 7 illustrates a modified arrangement of the biasing mechanism for the slide or carriage. In this embodiment a slide 60, similar in construction to slide 13, is mounted for vertical sliding movement on guide tracks 12 of mounting plate 9 and a yoke 61 is mounted for horizontal sliding movement on a pair of spaced guide tracks 62 secured to one of the side plates 63 of slide 60. Gas spring assembly 64 is located within carriage 60 and includes a cylinder 65 which is attached to a lug 66 projecting inwardly from one of the side plates 63. Piston rod 67, which projects outwardly from the opposite end of cylinder 65, is connected to yoke 61. The force of the gas in gas spring assembly 64 will normally force yoke 61 outwardly away from dock 2.

A cable 68 is dead ended at 69 on slide 60, then passes around a pulley 70 rotatably mounted on the outer end of yoke 61. Cable 68 then travels around a pulley 71 journalled on side plate 63 and then around a second pulley 72 rotatably mounted on the lower end of yoke 61. Cable 68 then passes inwardly over a pulley 73 and is secured to a lug 74 on the fixed mounting frame. With this arrangement, the force of the gas spring assembly 64 will urge the carriage 60 upwardly and the cable and pulley arrangement will provide a substantially greater stroke of movement for carriage 60 than the stroke of piston 66.

In the construction shown in FIG. 7, the entire biasing mechanism is located within slide 60 in a location where it will not be subject to impact or damage and will be protected from dirt, weather and the elements.

For purposes of clarity, the operating mechanism for operating release member 32 is not shown in FIG. 7.

Figure 8:
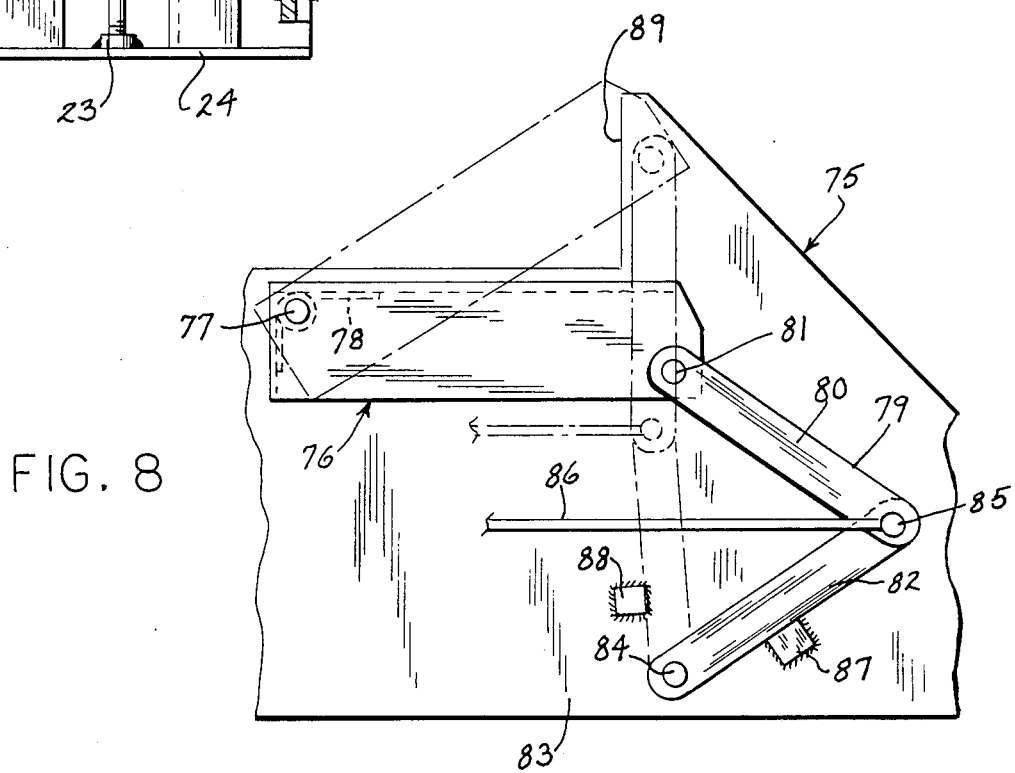
FIG. 8 is a fragmentary vertical section of a further form of the vehicle restraint utilizing a modified release mechanism.

FIG. 8 illustrate a modified form of the mechanism for operating the release member or bar. As shown in FIG. 8, a slide or carriage 75 similar in construction to slide 13, is mounted for sliding movement on the mounting frame, and a release member 76, similar in construction to release member 32, is pivoted to the inner end of slide 75 at pivot 77. As previously described, release member 76 is biased to an upper position by a torsion spring 78.

To actuate release member 76, a toggle mechanism 79 inconnects the outer end of the release bar 76 with slide 75. Toggle mechanism 79 includes a link 80 which is pivoted to the outer end of release bar 76 at pivot 81, while a second link 82 is pivotally connected to the lower end of one of the side plates 83 of slide 75 at pivot 84. The adjacent ends of links 80 and 82 are connected together at a pivot 85.

Toggle links 80 and 82 are movable between an under center position as shown by the full lines in FIG. 8, and an over-center or locked position, as shown by the phantom lines in FIG. 8, through a push-pull rod 86 which is connected to the pivot pin 85. Rod 86 can be operated manually by an operator standing on loading dock 2, or alternately, can be power operated or can be tied in to movement of the ramp 7 or lip 8 of the dockboard 6.

A pair of stops 87 and 88 are mounted on the side plate 83 of slide 75 and limit the position of the toggle links 80 and 82 in the under-center and over-center positions.

When it is desired to release the ICC bar 3 from engagement with the notch 89 in slide 75, rod 86 is pulled inwardly toward the dock 2, moving the toggle links 80 and 82 from the under-center position to the over center position as shown by the phantom lines in FIG. 8. This action will create an upward force against ICC bar 3, and as ICC bar 3 cannot be moved upwardly, a resultant downward force is created to move slide 75 down against the force of the gas spring biasing mechanism.

When the toggle mechanism reaches the over-center position, it will be latched so that the release bar 76 cannot be depressed, and thus outward movement of the ICC bar as the truck pulls away will wedge the release bar 76 and slide 75 downwardly against the force of the gas spring biasing mechanism until the ICC bar 3 passes the peak of the slide.

While the drawings have illustrated the use of a crank plate or toggle linkage for moving the release bar, it is contemplated that other mechanisms such as a linear actuator or a hydraulic cylinder can also be employed. Similarly, biasing mechanisms, other than gas spering assemblies 20 and 64, can be used to urge the slide or restraining member to an upper position.

Various modes of carrying out the invention are contemplated as being within the scope of the following claims particularly pointing out and distinctly claiming the subject matter which is regarded as the invention.

I claim:

1. A vehicle restraint, comprising a frame mounted on a supporting structure, a slide mounted for vertical movement on said frame, said slide including a inclined surface extending downwardly and outwardly with respect to said supporting surface, said slide having a recess disposed inwardly in a direction toward said supporting structure from the upper end of said inclined surface, biasing means for urging the slide to an upper position relative to said supporting structure, an abutment on a vehicle backing toward said supporting structure disposed to engage said inclined surface to wedge said slide downwardly against the force of said biasing means and effect engagement of said abutment with said recess thereby preventing said vehicle from pulling away from said supporting structure, and release means for releasing said abutment from said recess to enable said vehicle to pull away from the supporting structure.

2. The vehicle restraint of claim 1, wherein said release means comprises a release member mounted in said recess for movement between a lower position and an upper release position, and actuating means for moving said release member from said lower position toward said upper position, movement of said release member toward said upper position creating an upward force against said abutment and a resultant downward force against said slide to move said slide downwardly and cause release of said abutment from said recess.

3. The vehicle restraint of claim 2, wherein said release member is pivotally connected to said slide on a horizontal pivot axis, said actuating means including power operated means connected to the release member at a location spaced from said pivot axis.

4. The vehicle restraint of claim 3, wherein said power operated means is carried by said slide.

5. The vehicle restraint of claim 1, wherein the outer end of said recess is bordered by a generally vertical shoulder.

6. The vehicle restraint of claim 3, wherein said power operating means comprises an arm pivotally connected to said release member and a rotatable crank connecting said arm and a power source.

7. A vehicle restraint, comprising a frame mounted on a supporting structure, a restraining member mounted for vertical movement relative to said frame, said restraining member projecting outwardly from the supporting structure and having an outer inclined surface extending downwardly and outwardly from said frame, said restraining member also having an upper surface and having a recess disposed in said upper surface and located inwardly in a direction toward said frame from said inclined surface, biasing means for urging said restraining member upwardly to an upper position, an abutment on a vehicle backing toward said supporting structure disposed to engage said inclined surface to wedge said restraining member downwardly against the force of said biasing means and said abutment riding over the upper end of said inclined surface and being engaged with said recess to prevent movement of said vehicle away from said supporting structure, and release means carried by said restraining member and engagable with said abutment for lowering the restraining member against the force of said biasing means to thereby move said recess out of registry with said abutment to enable said vehicle to mvoe away from said supporting structure.

8. The vehicle restraint of claim 7, wherein said release means comprises a release member mounted for movement relative to said restraining member and movable between an upper release position and a lower position.

9. The vehicle restraint of claim 8, wherein said release member when in said upper position slopes upwardly and outwardly from said supporting structure and the outer end of said release member is disposed adjacent said upper end of said inclined surface.

10. The vehicle restraint of claim 8, and including locking means for locking the release member in the upper position.

11. The vehicle restraint of claim 10, and including means for unlocking the release member from the upper position.

12. In a vehicle restraint, a frame mounted on a supporting structure, a restraining member mounted for vertical movement on said frame and projecting outwardly from said frame, said restraining member having an inclined outer surface extending downwardly and outwardly from the frame and having an upper end spaced outwardly from said frame and having a lower end, and biasing means for urging the restraining member to an upper position relative to the frame, said inclined surface disposed to be engaged by a generally horizontal bar on a vehicle as the vehicle backs toward the supporting structure, said bar wedging said restraining member downardly against the force of said biasing means, said restraining member having an upwardly facing notch located inwardly toward said frame from said upper end of said inclined surface and disposed to receive said bar and prevent said vehicle from moving away from said supporting structure, said restraining member being movable downwardly against the force of said biasing means to permit said vehicle to move away from said structure.

13. The vehicle restraint of claim 1, wherein said biasing means includes spring means disposed within the slide, one end of said spring means being connected to said slide, and a flexible member connecting the opposite end of said spring means to said frame.

14. The vehicle restraint of claim 12, wherein said spring means comprises a gas spring.

15. In combination, a loading dock having a vertical face, a mounting frame mounted on said vertical face, a slide mounted for vertical movement on said frame, said slide projecting outwardly from said frame and having an outer inclined surface extending downwardly and outwardly in a direction away from said frame, said slide having a notch disposed inwardly in a direction toward said dock from the upper end of said inclined surface, said notch being bordered at its outer extremity by a generally vertical shoulder, biasing means for urging the slide to an upper position relative to said frame, bumper means mounted on said face adjacent said frame, the outer extremity of said bumper means being located a substantial distance inwardly toward the dock from said shoulder, an abutment on a vehicle backing toward said dock engaging said inclined surface to wedge said slide downwardly against the force of said biasing means and continued movement of said vehicle toward the dock causing said vehicle to engage said bumper means and causing said abutment to be received within said notch, and release means for releasing the engagement of said abutment with said notch at the completion of a loading operation to thereby permit the vehicle to pull away from said dock.

16. The vehicle restraint of claim 14, wherein said release means is constructed and arranged to exert an upward force against said abutment to cause a reactive downward force on said slide to lower the slide against the force of said biasing means to enable the abutment to be disengaged from said notch.

17. A vehicle restraint, comprising a frame mounted on a supporting structure, a slide mounted for vertical movement on said frame, said slide including a inclined surface extending downwardly and outwardly with respect to said supporting surface, said slide having a recess disposed inwardly in a direction toward said supporting structure from the upper end of said inclined surface, biasing means for urging the slide to an upper position relative to said supporting structure, an abutment on a vehicle backing toward said supporting structure disposed to engage said inclined surface to wedge said slide downwardly against the force of said biasing means and effect engagement of said abutment with said recess thereby preventing said vehicle from pulling away from said supporting structure, a release member mounted in said recess for movement between a lower position and an upper release position, actuating means for moving said release member from said lower position toward said upper position, movement of said release member toward said upper position creating an upward force against said abutment and a resultant downward force against said slide to move said slide downwardly and cause release of said abutment from said recess, and means for locking said release member in the upper position to prevent relative movement between said release member and said slide, whereby outward movement of said vehicle from the dock will cause said abutment to wedge the release member and slide downwardly to enable the vehicle to move away from the dock.

18. The vehicle restraint of claim 17, wherein said release member is pivoted to said slide, and said actuating means comprises a toggle linkage connecting said release member and said slide.

19. The vehicle restraint of claim 18, wherein said toggle linkage includes a pair of toggle links movable between an under-center position where said release member is disposed adjacent the bottom of said recess to a locked over-center position where said release member is disposed at the upper end of said recess, said actuating means also including means for moving said toggle links between said under-center and over-center positions.

20. The vehicle restraint of claim 17, wherein said release member is pivoted at its inner end to said slide and is disposed adjacent the bottom of said receess when in said lower position and extends upwardly and outwardly from said structure when in said upper position, the outer end of said release member when in said upper position being disposed adjacent the inner end of said inclined surface.

21. The vehicle restraint of claim 20, wherein said release member has a generally U-shaped cross section and includes a central section and a pair of spaced downwardly extending side flanges.

22. The vehicle restraint of claim 17, wherein said actuating means comprises power operated means carried by said slide and interconnecting said slide and said release member.

23. A vehicle restraint, comprising a frame mounted on a supporting structure, a slide mounted for vertical movement on said frame, said slide including an inclined surface extending downwardly and outwardly with respect to said supporting surface, biasing means for urging the slide to an upper position relative to said supporting structure, an abutment on a vehicle backing toward said supporting structure disposed to engage said inclined surface to wedge said slide downwardly against the force of said biasing means, means mounted on said slide and disposed in the path of outward movement of said abutment for preventing movement of said vehicle away from said structure, an elongated extension member extending downwardly and outwardly from said inclined surface and forming an extension to said inclined surface, pivot means for pivoting the upper portion of said extension member to said slide, means for preventing downward pivotal movement of said extension member relative to said slide, and connecting means interconnecting said extension member with said frame for pivoting said extension member upwardly as said slide moves downwardly.

24. The vehicle restraint of claim 23, wherein said connecting means is a link of fixed length.

* * * * *